United States Patent
Yan et al.

(10) Patent No.: US 12,413,305 B2
(45) Date of Patent: Sep. 9, 2025

(54) SYSTEM AND METHOD FOR PROCESSING SIGNALS ACQUIRED FROM MULTIPLEXED OPTICAL SENSORS

(71) Applicant: XEROX CORPORATION, Norwalk, CT (US)

(72) Inventors: Jin Yan, Palo Alto, CA (US); Tu Hoang, Palo Alto, CA (US); Qiushu Chen, San Jose, CA (US); Turki Haj Mohamad, Palo Alto, CA (US); Ajay Raghavan, Mountain View, CA (US); Peter Kiesel, Palo Alto, CA (US); Ozan Celik, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 153 days.

(21) Appl. No.: 18/226,911

(22) Filed: Jul. 27, 2023

(65) Prior Publication Data
US 2024/0039630 A1      Feb. 1, 2024

Related U.S. Application Data

(60) Provisional application No. 63/392,551, filed on Jul. 27, 2022.

(51) Int. Cl.
*H04B 10/079* (2013.01)

(52) U.S. Cl.
CPC . *H04B 10/07957* (2013.01); *H04B 10/07955* (2013.01)

(58) Field of Classification Search
None
See application file for complete search history.

(56) References Cited

U.S. PATENT DOCUMENTS

| | | | |
|---|---|---|---|
| 6,492,636 B1* | 12/2002 | Chen | G01J 3/18 |
| | | | 385/12 |
| 2005/0269489 A1* | 12/2005 | Taverner | G01J 3/1895 |
| | | | 250/227.14 |
| 2006/0034558 A1* | 2/2006 | Vidal | G01D 5/35354 |
| | | | 385/12 |
| 2015/0285683 A1* | 10/2015 | Ouellette | G01D 5/35383 |
| | | | 356/451 |
| 2019/0280767 A1* | 9/2019 | Haber | H04B 10/2537 |

* cited by examiner

*Primary Examiner* — David W Lambert
(74) *Attorney, Agent, or Firm* — Mueting Raasch Group (57) ABSTRACT

A method comprises receiving streaming data in the form of peak readings developed from spectrum data produced by multiplexed optical sensors of one or more optical fibers. The streaming data comprises wavelength and intensity data associated with the sensors. The method comprises determining, for a particular fiber, whether a number of the peak readings is the same as, or differs from, an expected number, N, where N corresponds to a total number of sensors of the particular fiber. The method also comprises correcting anomalous streaming data in response to determining that the number of the peak readings differs from the expected number, N. The method further comprises storing nominal wavelength and intensity streaming data and the corrected wavelength and intensity streaming data in a structured data table indexed by fiber ID and sensor ID.

18 Claims, 9 Drawing Sheets

Global Variations

SYSTEM AND METHOD FOR PROCESSING SIGNALS ACQUIRED FROM MULTIPLEXED OPTICAL SENSORS

RELATED PATENT DOCUMENTS

This application claims the benefit under 35 U.S.C. Section 119 of U.S. Provisional Patent Application Ser. No. 63/392,551 entitled SYSTEM AND METHOD FOR PROCESSING SIGNALS ACQUIRED FROM MULTIPLEXED OPTICAL SENSORS filed on Jul. 27, 2022, which is incorporated herein by reference in its entirety.

TECHNICAL FIELD

This application relates generally to techniques for processing signals acquired from multiplexed optical sensors, such as fiber Bragg grating sensors. The application also relates to components, devices, systems, and methods pertaining to such techniques.

SUMMARY

Some embodiments are directed to a method comprising receiving streaming data in the form of peak readings developed from spectrum data produced by multiplexed optical sensors of one or more optical fibers. The streaming data comprises wavelength and intensity data associated with the sensors. The method comprises determining, for a particular fiber, whether a number of the peak readings is the same as, or differs from, an expected number, N, where N corresponds to a total number of sensors of the particular fiber. The method also comprises correcting anomalous streaming data in response to determining that the number of the peak readings differs from the expected number, N. The method further comprises storing nominal wavelength and intensity streaming data and the corrected wavelength and intensity streaming data in a structured data table indexed by fiber ID and sensor ID.

Some embodiments are directed to a system which includes a sensor network comprising a network of multiplexed optical sensors of one or more optical fibers. A processor is operatively coupled to the sensor network. The processor is configured to receive streaming data in the form of peak readings developed from spectrum data produced by the sensors. The streaming data comprises wavelength and intensity data associated with the sensors. The processor is configured to determine, for a particular fiber, whether a number of the peak readings is the same as, or differs from, an expected number, N, where N corresponds to a total number of sensors of the particular fiber. The processor is also configured to correct anomalous streaming data in response to determining that the number of the peak readings differs from the expected number, N. A memory is operatively coupled to the processor. The processor cooperates with the memory to store nominal wavelength and intensity streaming data and the corrected wavelength and intensity streaming data in a structured data table indexed by fiber ID and sensor ID.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. An FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (e.g., strain, temperature, vibration) that changes the periodicity of the grating and/or the index of refraction of the fiber. Thus, FBG sensors rely on the detection of small wavelength changes in response to stimuli of interest.

The sensors disclosed herein are generally described as fibers inscribed with FBG arrays as the sensing element. FBGs are wavelength-specific narrow-band reflectors formed in the core of standard fibers by introducing a periodic variation in the refractive index (RI) of the fiber core. Several factors, including temperature and strain, that change the RI variation will shift the reflection wavelength of an FBG and thus be sensed by the FBG. While embodiments described herein use FBG sensors as an example, it is to be understood that any suitable types of sensors may be used. Detailed considerations for FBG array design for the specific use case are discussed. The proposed fiber optic-based sensing system has several unique characteristics. For example, the sensing system may be substantially immune to electromagnetic interference. This allows for less frequent system maintenance and/or calibration, which may be useful for reliable long-term deployment in the field.

FBG sensors are often deployed in harsh environments and subject to significant loads and ambient fluctuations. In addition to monitoring a specified physical parameter (e.g., cracking, corrosion, strain) of the monitored asset components, FBG sensors themselves and/or their fibers can potentially undergo cracking or delamination. The spectral signal can consequently be distorted by confounding effects, thus affecting the sensed signal and the accuracy of the measurements. Embodiments of the disclosure are directed to methodologies for resolving bias and confounding effects in the upsampled signal coming from multiplexed fiber optic sensors. Embodiments includes a peak searching algorithm for distributed FBG sensors to ingest the sensor readings in a structured format, and a methodology for detecting abnormal readings to infer the state of particular FBG sensors.

Figures 1A, 1B:
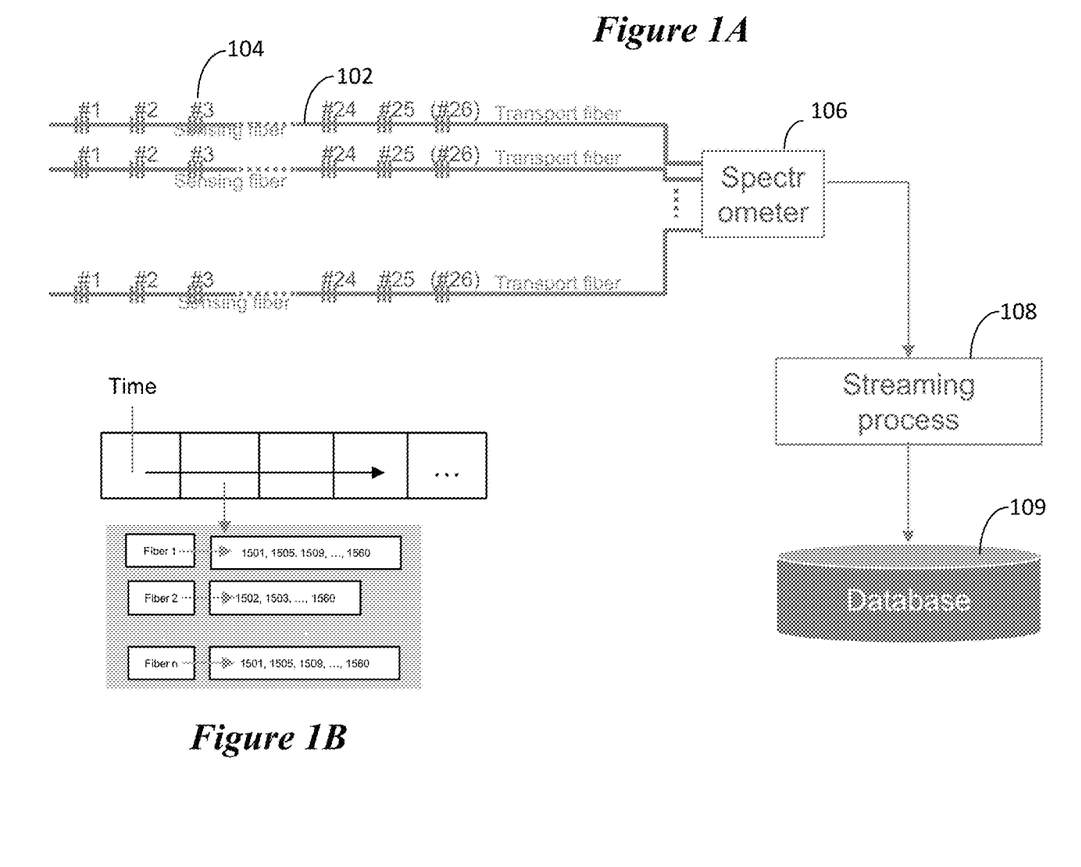
FIG. 1A illustrates a framework of a streaming data processing system for processing peak wavelength and intensity readings produced by multiplexed optical sensors of one or more fibers in accordance with various embodiments.
FIG. 1B illustrates a dictionary of unindexed fiber readings for multiplexed optical sensors of a multiplicity of fibers.

FIG. 1A illustrates a framework of a streaming data processing system in accordance with various embodiments. FIG. 1A shows a number of sensing fibers 102 each comprising a multiplicity of FBG sensors 104. For example, each fiber 102 can include up to 26 FBG sensors 104. The sensing fibers 102 are coupled to an FBG interrogator 106, which includes a spectrometer. Spectrum data from the FBG interrogator 106 is transformed into peak wavelength. The output for each spectrum is expected to be N values representing N peak reading (e.g., peak indices/wavelengths), where N equals the expected number of sensors on a given sensing fiber 102. This process is preferably performed on the FBG interrogator 106 or edge devices capable of embedded peak tracing in real-time or near real-time. The identified N peak readings and the N heights of the peak readings (e.g., power intensities) are produced continuously for each sensing fiber 102.

Figure 1C:
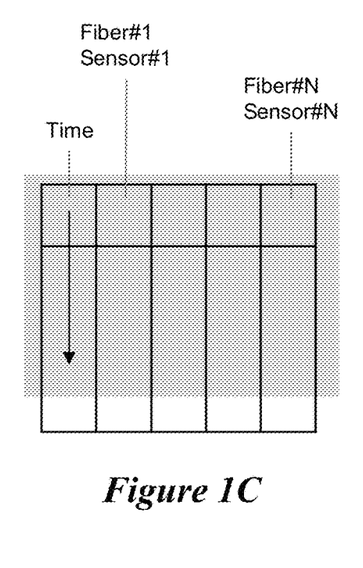
FIG. 1C illustrates an indexed data table with fiber ID and sensor ID indexed within column names in accordance with various embodiments.

A streaming process 108 can involve determining, for a particular fiber, whether a number of the peak readings is the same as, or differs from, an expected number, N, where N corresponds to a total number of sensors of the particular fiber. The streaming process 108 can also involve correcting anomalous streaming data in response to determining that the number of the peak readings differs from the expected number, N. The streaming process 108 can further involve storing nominal wavelength and intensity streaming data and the corrected wavelength and intensity streaming data in a structured data table indexed by fiber ID and sensor ID (see, e.g., FIG. 1C).

Figure 2A:
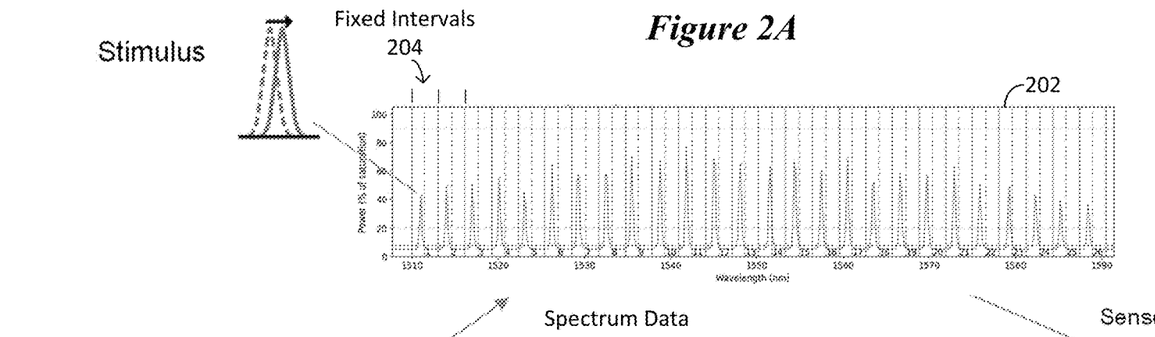
FIG. 2A shows streaming data in the form of a series of peak wavelength and intensity readings developed from spectrum data produced by multiplexed fiber optic sensors in accordance with various embodiments.
Figure 2B:
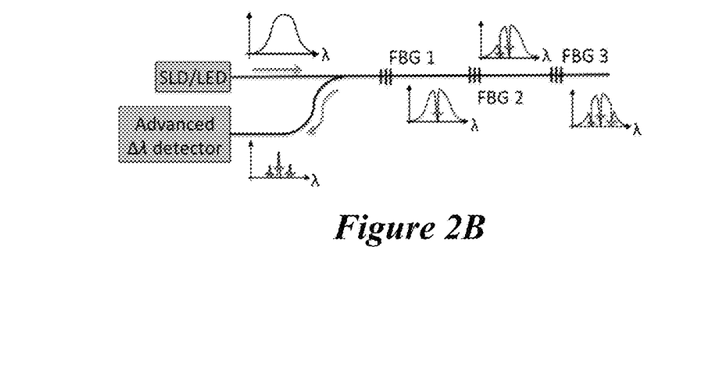
FIG. 2B illustrates a wavelength multiplexed system that can use a compensated sensor array comprising multiple FBG sensors disposed on a single optical fiber to produce spectrum data in accordance with various embodiments.
Figure 2C:
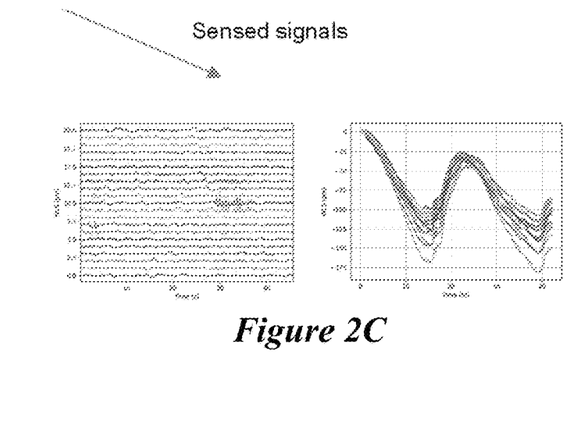
FIG. 2C shows sensed signals corresponding to the peak wavelength and intensity readings shown in FIG. 2A.

With reference to FIG. 2A, streaming data 202 is shown in the form of peak readings developed from spectrum data produced by multiplexed optical sensors of one or more optical fibers. The streaming data 202 comprises wavelength and intensity data associated with the sensors. The streaming data 202 includes peak readings that fall into fixed intervals 204 that correspond to different wavelength ranges (e.g., as specified by the fiber manufacturer). The number of fixed intervals corresponds to the number of sensors of a given fiber. For the streaming data 202 shown in FIG. 2A, it can be seen that one peak reading falls into one interval, as expected. As such, the output for the streaming data 202 would be N values representing N peak readings, where N equals the number of sensors for this fiber.

Figure 3A:
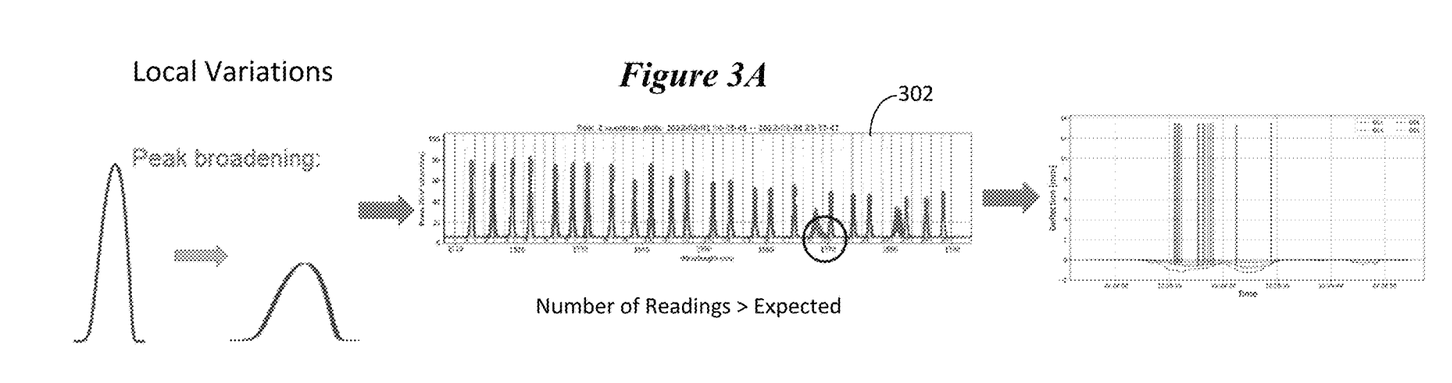
FIGS. 3A-3C illustrate streaming data in the form of peak wavelength and intensity readings which includes abnormal peak readings produced by an optical sensor subject to local variations.

In some cases, the number of peak readings of the streaming data 202 may differ from the number, N, of sensors of a given fiber. For example, and with reference to FIG. 3A, the number of peak readings of the streaming data 302 may be greater than expected, in which case the number of peak readings exceeds the number, N, of sensors (e.g., 27 peaks are detected rather than the expected 26, where N=26). This can occur from a local variation referred to as peak broadening. A local variation refers to anomalous behavior occurring for a particular sensor. Local variations within one or more sensors can affect the readings, resulting in sudden jumps in the data.

Figure 3B:
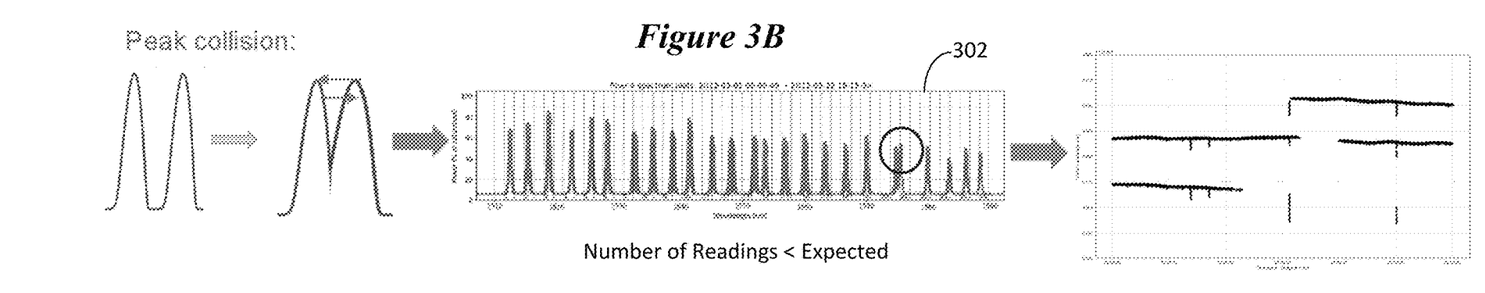
Figure 3C:
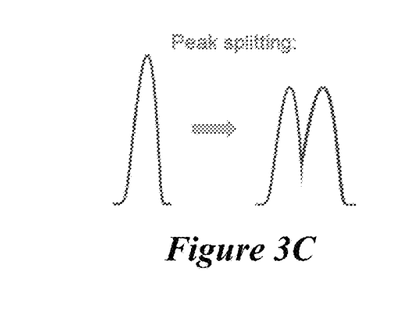

In some cases, and with reference to FIG. 3B, the number of peak readings of the streaming data 302 may be less than expected, in which case the number of peak readings is less than the number, N, of sensors (e.g., 25 peaks are detected rather than the expected 26, where N=26). This can occur from a local variation referred to as peak collision. The number of peak readings can be less than the number, N, of sensors due to a local variation referred to as peak splitting, an example of which is shown in FIG. 3C.

Figure 4A:
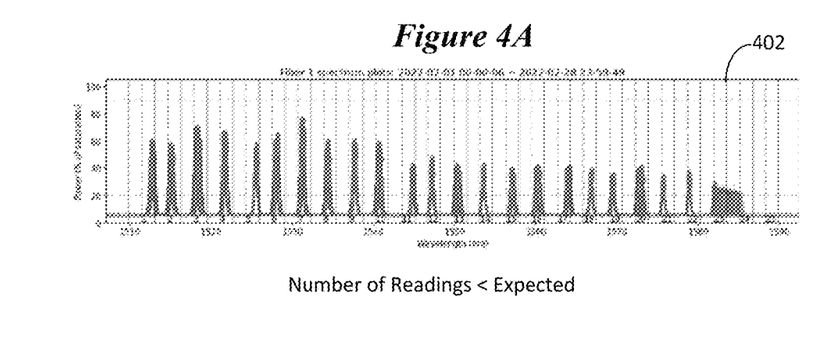
FIGS. 4A-4C illustrate streaming data in the form of peak wavelength and intensity readings which includes abnormal peak readings produced by an optical sensor subject to global variations.
Figure 4B:
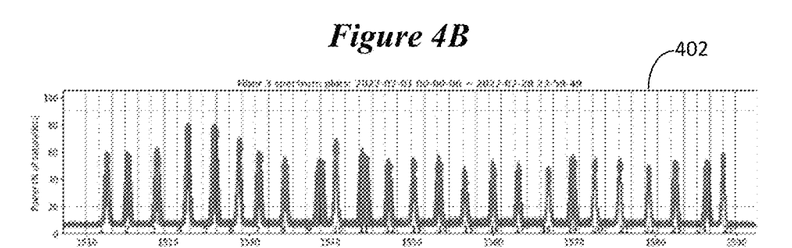
Figure 4C:
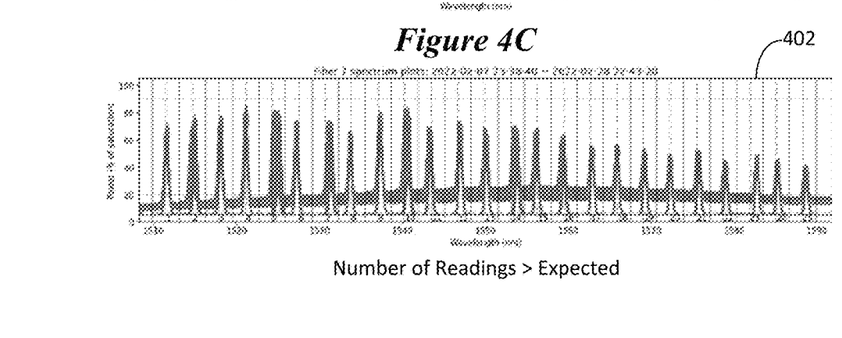

Global variations can occur which can cause the number of peak readings of the streaming data to differ from the number, N, of sensors of a given fiber. FIG. 4A shows streaming data 402 resulting from a global variation in which part of the fiber or a subset of the sensors have been lost during the operation. In this case, the number of peak readings of the streaming data 402 would be less than expected (e.g., 20 peak readings are detected rather than the expected 25 peak readings, were N=25). FIGS. 4B and 4C show streaming data 402 resulting from a global variation in which the whole fiber has a problem that induces the background to have a fluctuation. In this case, the number of peak readings of the streaming data 402 would be larger than expected (e.g., 50 peak readings are detected rather than the expected 25 peak readings, were N=25).

Figure 5:
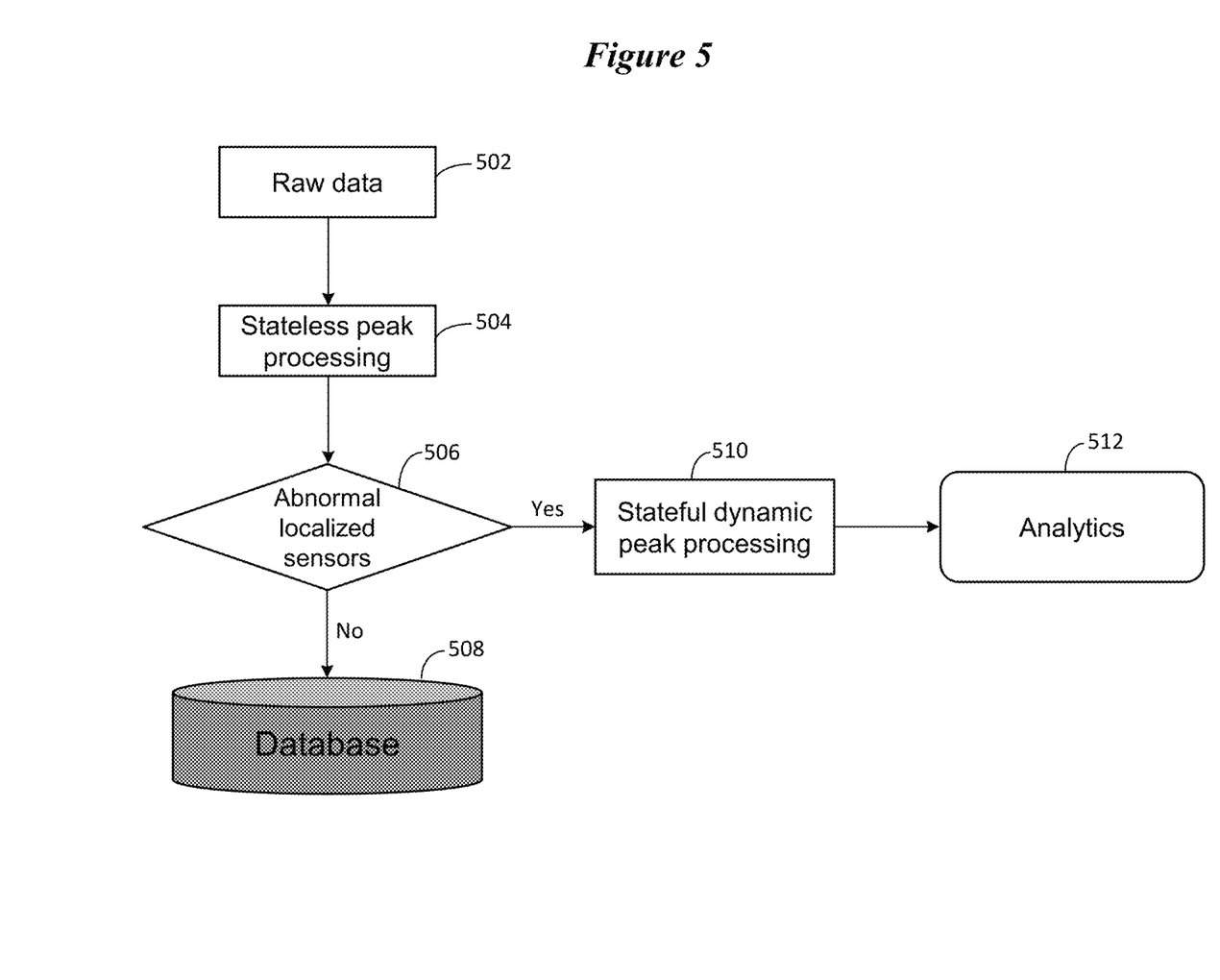
FIG. 5 illustrates a method of stateless peak processing and stateful dynamic peak processing associated with the streaming process shown in FIG. 1A.
Figure 6:
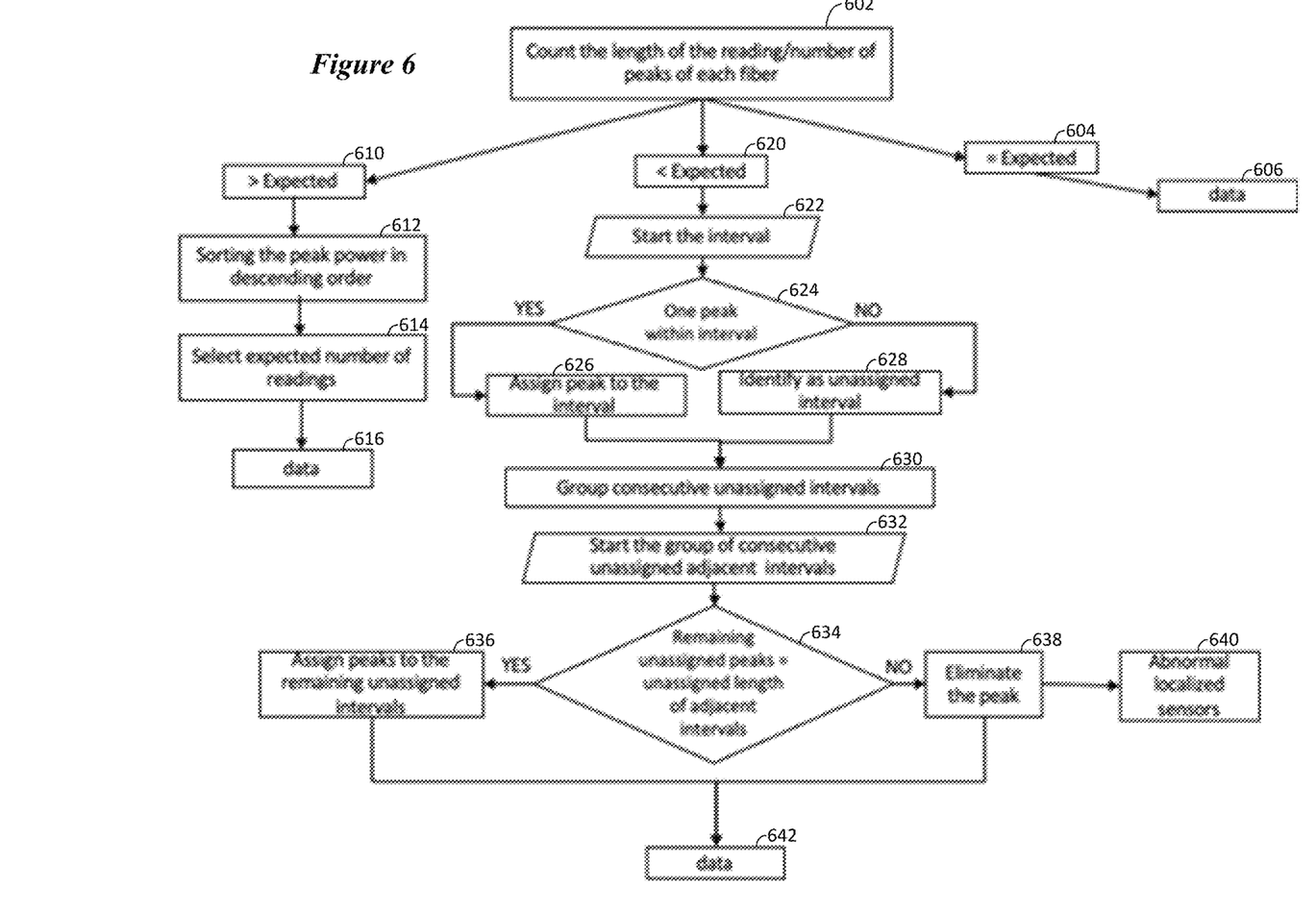
FIG. 6 illustrates a stateless peak processing method in accordance with various embodiments.

FIG. 5 illustrates a method of stateless peak processing and stateful dynamic peak processing associated with the streaming process 108 shown in FIG. 1A. The method shown in FIG. 5 involves receiving 502 raw streaming data in the form of peak readings of spectrum data produced by multiplexed optical sensors of one or more optical fibers. The streaming data is subject to stateless peak processing 504, an illustrative example of which is shown in FIG. 6. The stateless peak processing 504 can identify 506 abnormal localized sensors, if any.

For nominal sensors, the streaming process reorganizes a dictionary of unindexed fiber readings (see, e.g., FIG. 1B) into an indexed data table (see, e.g., FIG. 1C) with fiber ID and sensor ID indexed within column names. The indexed data table shown in FIG. 1C includes a time column which corresponds to the time of each timestamp. The columns of the indexed data table include a column for each fiber (by ID) and each sensor (by ID) of that fiber. The structure data table is stored in a database 508.

Abnormal localized sensors, if any, are detected at block 506 within the processing steps of the streaming process 108. For example, an abnormal peak observer process can be activated to perform a dynamic peak assignment 510 (see, e.g., FIG. 7), and thus analyze and track the trend of sensor performance 512. Readings of the nominal sensors are processed through a stateless peak processing step and are saved in the structured format within the database 109 for further batch processing.

FIG. 6 illustrates a stateless peak processing method in accordance with various embodiments. The stateless peak processing method shown in FIG. 6 is implemented for each fiber of the system. The method involves counting 602 the number of peak readings in the streaming data acquired from each fiber. In some cases, the number of peak readings can be the same as the expected number, N, where N corresponds to the total number of sensors of each fiber. In some cases, the number of peak readings can be greater than the expected number, N. In some cases, the number of peak readings can be less than the expected number, N. FIG. 6 shows stateless peak processing steps for each of these cases.

In the case 604 where the number of peak readings is the same as the expected number, N, the method involves storing nominal wavelength and intensity streaming data 606 in the structured data table by sensor ID. In some implementations, the nominal wavelength and intensity streaming data can be stored in the structured data table by sensor ID in an ascending or descending order based on peak wavelengths for each fiber. In some implementations, the nominal wavelength and intensity streaming data can be stored in the structured data table by sensor ID in an ascending or descending order based on intensities for each fiber. In the case 610 where the number of peak readings is greater than the expected number, N, the method involves sorting 612 the peak readings based on peak height/intensity in descending order, selecting 614 the first N peak readings of the sorted peak readings, and storing 616 wavelength and intensity streaming data for the first N peak readings in the structured data table by sensor ID for each fiber.

In the case 620 where the number of peak readings is less than the expected number, N, the method involves a search for peak readings within each of the fixed intervals of the wavelength and intensity streaming data (see, e.g., fixed intervals 204 shown in FIG. 2A). As previously discussed, for each sensor there is an expected wavelength range or wavelength interval. The number of fixed intervals corresponds to the number of sensors of each fiber. Starting a loop of each interval 622, a search is made to determine if any peak reading falls within the interval. If there is only a single peak reading within the fixed interval 624, this single peak reading is assigned 626 to the interval. If there is no peak reading or more than one peak reading within that interval, the interval is identified 628 as an unassigned interval. This process is repeated for all fixed intervals for each fiber.

After looping through the fixed intervals for a fiber and assigning the first round of peak readings as specified above, consecutive unassigned intervals are grouped 630 and processing continues by looping through 632 these consecutive unassigned intervals. If the remaining unassigned adjacent intervals have the same number of unassigned peaks within the spectrum wavelength range, the peak readings are then assigned to these intervals by order. If the remaining unassigned adjacent intervals have a smaller number of unassigned peaks within the spectrum wavelength range, these sensors are not assigned (e.g., the peak readings are eliminated 638) and are identified 640 as abnormal localized sensors. The organized wavelength and intensity streaming data 642 is sent to the database and stored in the structure data table by sensor ID for each fiber.

Figure 7:
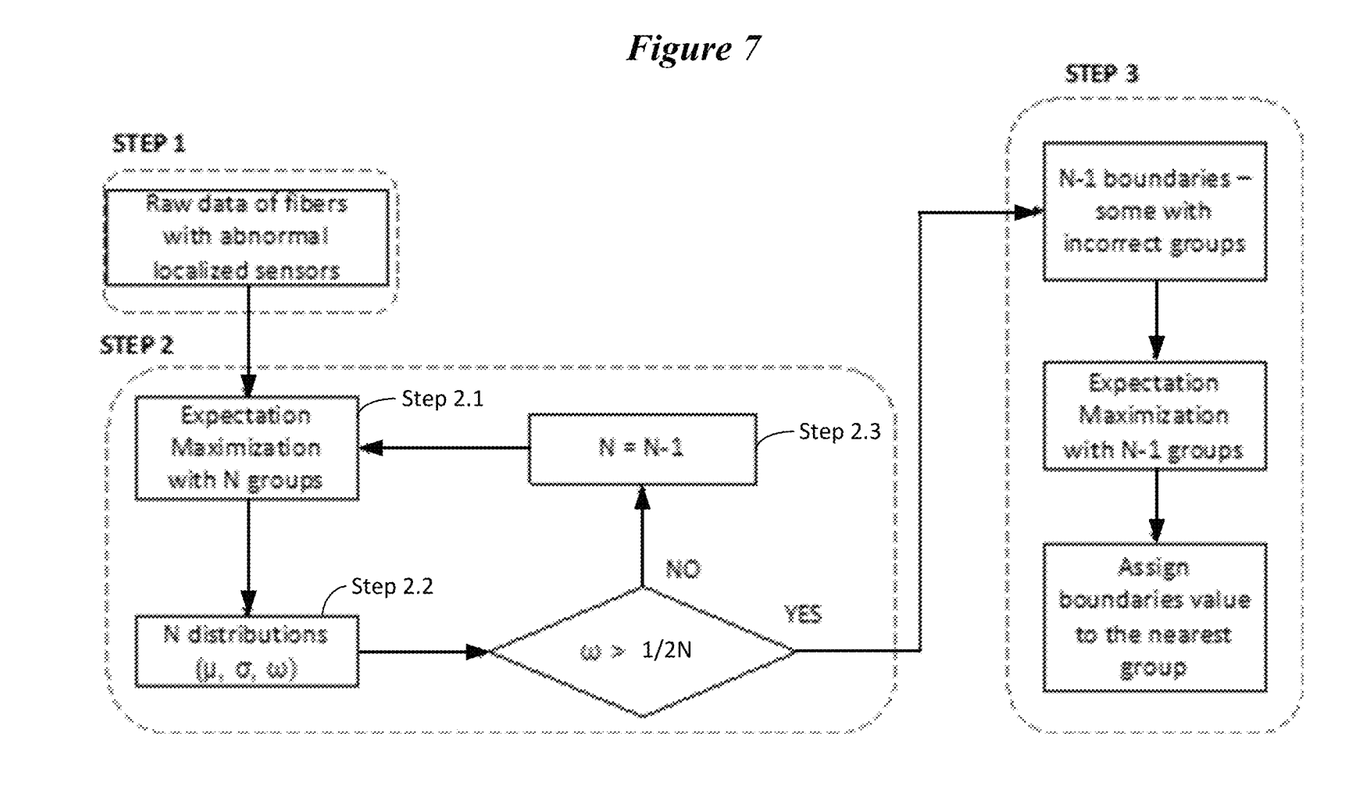
FIG. 7 illustrates a stateful dynamic peak processing method in accordance with various embodiments.

When the abnormal localized sensors are identified 640 from the stateless peak processing step, these sensors are usually undergoing multi-axial strain in contrast to the nominal sensors that undergo uni-axial strain in the direction of the optical fiber. These abnormal sensors are usually subject to indications of cracks, delamination, or potentially excessive strain in a particular FBG sensor (the latter resulting in the wavelength peak colliding with an adjacent FBG's wavelength peak). These localized abnormal sensors are then separated and analyzed through stateful dynamic peak processing, which comprises 3 main steps as shown in FIG. 7.

Step 1: Through the stateless peak-processing methodology illustrated in FIG. 6, the fibers with abnormal localized sensors are identified. The raw data for the fibers with abnormal localized sensors are processed in Steps 2 and 3 shown in FIG. 7.

Step 2 involves a peak assignment process in which all peak readings are processed in batches using an Expectation-Maximization (EM) algorithm to assign to N expected number of sensor groups. The batch size is dependent on the computational capability and type of application. At Step 2.1, all samples within the batch are used as observed data for the mixture of N independent normal distributions. At Step 2.2, the output of the EM algorithm with N groups is the mean ($\mu$), standard deviation ($\sigma$) of, and weight ($\omega$) of each sensor group. Ideally, if no data is missing, all weights ($\omega$) should equal 1/N, meaning all sensor groups have equal amounts of data.

Also at Step 2.2, a check is made to determine if any weights ($\omega$) are greater than ½N. If no weights ($\omega$) are smaller than ½N, then processing continues at Step 3. After this step, the peak readings are grouped into N groups without a "true" group ID. If there is any weight smaller than ½N, then the value of N is adjusted to N=N−1 at Step 2.3, and processing continues/repeats at Step 2.1.

Step 3 involves a decision boundary estimation methodology. For each batch, one set of (N−1) decision boundaries can be extracted. These boundaries are used to group the N sensors into N groups. However, group ID in one batch can be different from another batch (e.g., the 1st group of a batch can correspond to the "true" 2nd group because that batch does not have any data points in the "true" 1st group). To solve this issue, the EM algorithm is applied as a moving window to group decision boundaries between multiple batches, including the current and previous batches. Step 3 processes (N−1)×(number of batches) to establish a set of decision boundaries. Peak readings can then be assigned to the correct batch with the correct ID using the decision boundaries and then be further analyzed by tracking the trend of the changes.

Figure 8:
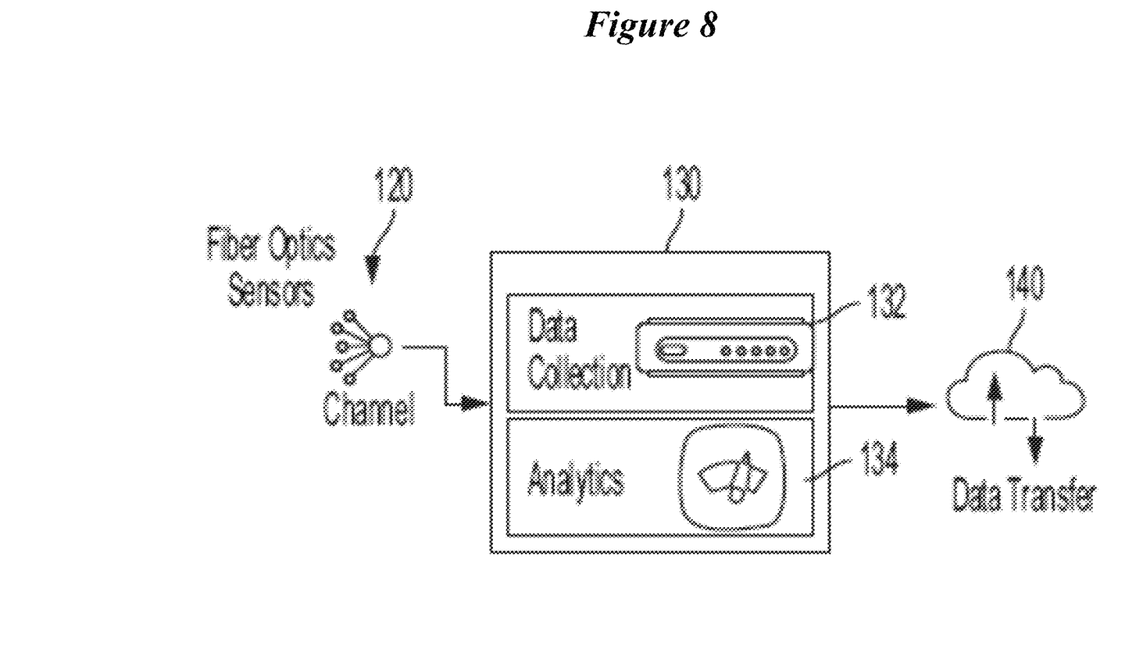
FIG. 8 illustrates a diagram of a fiber optic sensor monitoring system in accordance with various embodiments.

As discussed above, embodiments described herein involve fibers with an inscribed FBG array which are deployed in or on one or more assets (e.g., a structure such as a bridge or a roadway, a power grid electrical device such as a transformer). FIG. 8 illustrates a diagram of a fiber optic sensor monitoring system in accordance with embodiments described herein. Fiber optic sensors 120 are deployed in or on an asset for sensing one or more parameters (e.g., strain, temperature, pressure, vibration). The sensing operation produces FBG wavelength shift signals.

FIG. 8 illustrates a diagram of a fiber optic sensor monitoring system in accordance with various embodiments. The fiber optic sensors 120 are connected to an FBG interrogator at one end, where the center wavelength of each FBG on the fiber is tracked at a desired frequency. The center wavelengths of FBGs can be streamed to a processor 130 having a data collection module 132 and an analytics module 134. The analytics module 134 can be configured to perform the processes illustrated in the figures of this disclosure (e.g., FIGS. 5-7). The FBG sensor information stored the structured data table can be transferred to a predetermined location via a transmitter 140. For example, the information may be transferred to the cloud, enabling a remote-control center to use the information. In some implementations, information processing can occur after the raw sensor data are transferred to the cloud.

Typically, there are multiple FBG sensors on one fiber. The center wavelength of each FBG's reflection band distributes in a certain wavelength range. For example, the wavelength range can be from 1510 nm-1590 nm. In one embodiment, the reflection wavelength of each FBG on the same fiber has certain spacing in the spectrum. For example, the spectral spacing of FBGs on the same fiber can be ~2-3 nm. In the wavelength range 1510-1590 nm, a 3 nm spacing will allow ~26 FBGs on one fiber to be interrogated simultaneously. In another implementation, FBGs on the same fiber can have overlapped reflection bands and signals from different FBGs are distinguished by additional time domain features (e.g., reflection time). In general, the sensing fiber design for this application needs to consider the level of multiplexing needed and trade-offs between system performance (sampling rate, wavelength accuracy, etc.) and overall cost (hardware, installation, maintenance, etc.)

Figure 9:
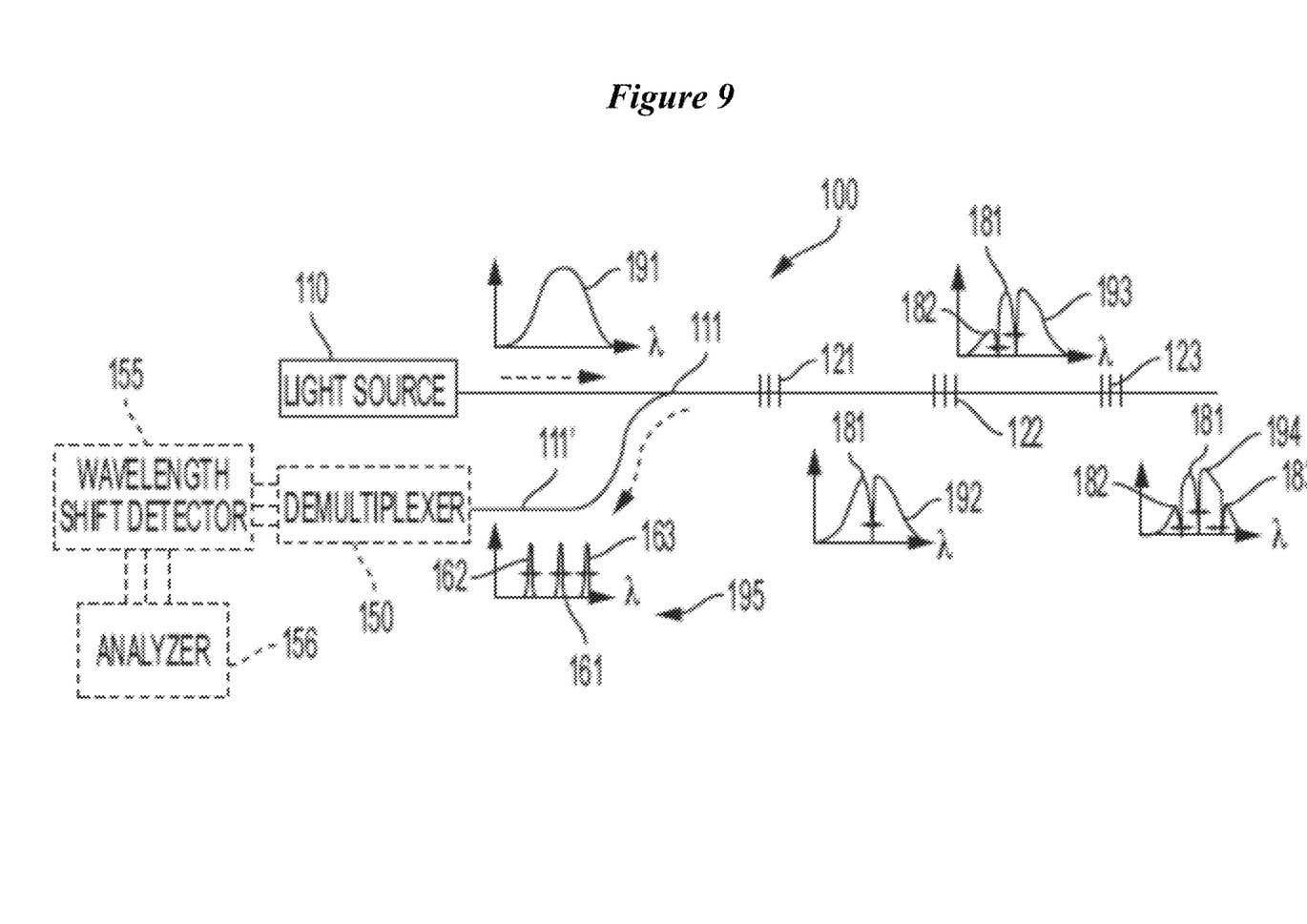
FIG. 9 shows a wavelength multiplexed system that can use a compensated sensor array comprising multiple FBG sensors disposed on a single optical fiber in accordance with various embodiments.

FO sensors can simultaneously measure multiple parameters distributed in space with high sensitivity in multiplexed configurations over long FO cables. One example of how this can be achieved is through FBG sensors. FIG. 9 shows a wavelength multiplexed system 100 can use a compensated sensor array comprising multiple FBG sensors 121, 122, 123 disposed on a single optical fiber 111. The sensors 121-123 may be arranged to sense parameters including one or more of temperature, strain, and/or vibration, for example. As indicated in FIG. 9, input light is provided by the light source 110, which may comprise or be a light emitting diode (LED) or superluminescent laser diode (SLD), for example. The spectral characteristic (intensity vs. wavelength) of broadband light is shown by inset graph 191. The intensity is highest near the middle of the spectrum and falls off at the spectrum edges. The sensors 121, 122, 123 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 111 to the first FBG sensor 121. The first FBG sensor 121 reflects a portion of the light in a first wavelength band having a central wavelength, $\lambda 1$. Light having wavelengths other than within the first wavelength band is transmitted through the first FBG sensor 121 to the second FBG sensor 122. The spectral characteristic of the light transmitted to the second FBG sensor 122 is shown in inset graph 192 and exhibits a notch 181 at the first wavelength band centered at $\lambda 1$ indicating that light in this wavelength band is reflected by the first sensor 121.

The second FBG sensor 122 reflects a portion of the light in a second wavelength band having a central wavelength, $\lambda 2$. Light that is not reflected by the second FBG sensor 122 is transmitted through the second FBG sensor 122 to the third FBG sensor 123. The spectral characteristic of the light transmitted to the third FBG sensor 123 is shown in inset graph 193 and includes notches 181, 182 centered at $\lambda 1$ and $\lambda 2$.

The third FBG sensor 123 reflects a portion of the light in a third wavelength band having a central or peak wavelength, $\lambda 3$. Light that is not reflected by the third FBG sensor 123 is transmitted through the third FBG sensor 123. The spectral characteristic of the light transmitted through the third FBG sensor 123 is shown in inset graph 194 and includes notches 181, 182, 183 centered at $\lambda 1$, $\lambda 2$, and $\lambda 3$.

Light in wavelength bands 161, 162, 163, having central wavelengths $\lambda 1$, $\lambda 2$ and $\lambda 3$ (illustrated in inset graph 195) is reflected by the first, second, or third FBG sensors 121, 122, 123, respectively, along the FO cables 111 and 111' to an optical wavelength demultiplexer 150. Compensating input characteristics of sensors 121, 122, 123 cause the difference in the intensity peaks of the light 161, 162, 163 to be reduced when compared to the intensity peaks from an uncompensated sensor array.

From the wavelength demultiplexer 150, the sensor light 161, 162, 163 may be routed to a wavelength shift detector 155 that generates an electrical signal responsive to shifts in the central wavelengths $\lambda 1$, $\lambda 2$ and $\lambda 3$ and/or wavelength bands of the sensor light. The wavelength shift detector 155 receives reflected light from each of the sensors and generates corresponding electrical signals in response to the shifts in the central wavelengths $\lambda 1$, $\lambda 2$ and $\lambda 3$ or wavelength bands of the light reflected by the sensors 121-123. The analyzer 156 may compare the shifts to a characteristic base wavelength (a known wavelength) to determine whether changes in the values of the parameters sensed by the sensors 121-123 have occurred. The analyzer 156 may determine that the values of one or more of the sensed parameters (e.g., temperature, strain, vibration) have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band WB1, sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having wavelength band WB2 during time period 2 and sense reflected light during time period 2a that overlaps time period 2. Following time period 2a, the light source may emit light having wavelength band WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources. Additional details of these processes are disclosed in commonly-owned U.S. patent application Ser. No. 17/393,986 filed Aug. 4, 2021, which is incorporated herein by reference in its entirety.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method, comprising:
receiving streaming data in the form of peak readings developed from spectrum data produced by multiplexed optical sensors of one or more optical fibers, the streaming data comprising wavelength and intensity data associated with the sensors;
determining, for a particular fiber, whether a number of the peak readings is the same as, or differs from, an expected number, N, where N corresponds to a total number of sensors of the particular fiber;
correcting anomalous streaming data in response to determining that the number of the peak readings differs from the expected number, N; and
storing nominal wavelength and intensity streaming data and the corrected wavelength and intensity streaming data in a structured data table indexed by fiber ID and sensor ID.

2. The method of claim 1, wherein if the number of the peak readings is equal to the expected number, N, then the method comprises storing the nominal wavelength and intensity streaming data in the structured data table by sensor ID.

3. The method of claim 1, wherein correcting the anomalous streaming data in response to determining that the number of the peak readings is greater than the expected number, N, comprises:
sorting the peak readings based on peak height or intensity in descending order;
selecting the first N peak readings of the sorted peak readings; and
storing wavelength and intensity data for the first N peak readings in the structured data table by sensor ID for each fiber.

4. The method of claim 1, wherein correcting the anomalous streaming data in response to determining that the number of the peak readings is less than the expected number, N, comprises:
for intervals of the streaming data that include a single peak reading, assigning the single peak readings to their corresponding intervals; and
identifying intervals of the streaming data that do not include a single peak reading as unassigned intervals;
wherein each interval defines an expected wavelength range for each of the sensors.

5. The method of claim 4, further comprising:
grouping consecutive unassigned intervals;
if the number of the remaining unassigned adjacent intervals is the same as the number of unassigned peak readings, assigning the peak readings to the remaining unassigned adjacent intervals by order and storing wavelength and intensity data associated with the assigned peak readings in the structured data table by sensor ID for each fiber;
if the number of the remaining unassigned adjacent intervals is smaller than the number of unassigned peak readings, no peak readings are assigned to the remaining unassigned adjacent intervals; and
identifying abnormal localized sensors as sensors in which no peak readings have been assigned.

6. The method of claim 1, further comprising:
identifying fibers with abnormal localized sensors using stateless peak processing; and
analyzing and tracking the abnormal localized sensors using stateful dynamic peak processing.

7. The method of claim 6, wherein:
(Step A) the peak readings of the abnormal localized sensors are processed in batches using an Expectation-Maximization (EM) algorithm to assign to N expected number of sensor groups, wherein an output of the EM algorithm comprises a mean ($\mu$), standard deviation ($\sigma$), and weight ($\omega$) of each sensor group; and
(Step B) if there is any weight smaller than ½N, then N is adjusted to N=N−1 and Step A is repeated.

8. The method of claim 7, wherein:
(Step C) if no weights are smaller than ½N, the peak readings are grouped into N sensor groups without a sensor group ID; and
(Step D) the method further comprises extracting, for each batch, one set of N−1 decision boundaries, wherein the decision boundaries are used to group the N sensors into N groups.

9. The method of claim 8, wherein:
the EM algorithm is applied as a moving window to group the decision boundaries between multiple batches; and
the peak readings are assigned to a correct batch with a correct sensor group ID using the decision boundaries.

10. A system, comprising:
a sensor network comprising a network of multiplexed optical sensors of one or more optical fibers;
a processor operatively coupled to the sensor network and configured to:
receive streaming data in the form of peak readings developed from spectrum data produced by the sensors, the streaming data comprising wavelength and intensity data associated with the sensors;
determine, for a particular fiber, whether a number of the peak readings is the same as, or differs from, an expected number, N, where N corresponds to a total number of sensors of the particular fiber; and
correct anomalous streaming data in response to determining that the number of the peak readings differs from the expected number, N; and
a memory operatively coupled to the processor, the memory configured to store nominal wavelength and intensity streaming data and the corrected wavelength and intensity streaming data in a structured data table indexed by fiber ID and sensor ID.

11. The system of claim 10, wherein if the number of the peak readings is equal to the expected number, N, then the processor stores the nominal wavelength and intensity streaming data in the structured data table by sensor ID.

12. The system of claim 10, wherein the processor is configured to correct the anomalous streaming data in response to determining that the number of the peak readings is greater than the expected number, N, by:
sorting the peak readings based on peak height or intensity in descending order;
selecting the first N peak readings of the sorted peak readings; and
storing wavelength and intensity data for the first N peak readings in the structured data table by sensor ID for each fiber.

13. The system of claim 10, wherein the processor is configured to correct the anomalous streaming data in response to determining that the number of the peak readings is less than the expected number, N, by:
for intervals of the streaming data that include a single peak reading, assigning the single peak readings to their corresponding intervals; and
identifying intervals of the streaming data that do not include a single peak reading as unassigned intervals;
wherein each interval defines an expected wavelength range for each of the sensors.

14. The system of claim 13, the processor is further configured to:
group consecutive unassigned intervals;
if the number of the remaining unassigned adjacent intervals is the same as the number of unassigned peak readings, assign the peak readings to the remaining unassigned adjacent intervals by order and storing wavelength and intensity data associated with the assigned peak readings in the structured data table by sensor ID for each fiber;
if the number of the remaining unassigned adjacent intervals is smaller than the number of unassigned peak readings, no peak readings are assigned by the processor to the remaining unassigned adjacent intervals; and
identify abnormal localized sensors as sensors in which no peak readings have been assigned.

15. The system of claim 10, wherein the processor is configured to:
identify fibers with abnormal localized sensors using stateless peak processing; and
analyze and track the abnormal localized sensors using stateful dynamic peak processing.

16. The system of claim 15, wherein:
(Step A) the peak readings of the abnormal localized sensors are processed by the processor in batches using an Expectation-Maximization (EM) algorithm to assign to N expected number of sensor groups, wherein an output of the EM algorithm comprises a mean ($\mu$), standard deviation ($\sigma$), and weight ($\omega$) of each sensor group; and
(Step B) if there is any weight smaller than ½N, then N is adjusted by the processor to N=N−1 and Step A is repeated.

17. The system of claim 16, wherein:
(Step C) if no weights are smaller than ½N, the peak readings are grouped by the processor into N sensor groups without a sensor group ID; and
(Step D) the processor is configured to extract, for each batch, one set of N−1 decision boundaries, wherein the decision boundaries are used to group the N sensors into N groups by the processor.

18. The system of claim 17, wherein:
the processor is configured to apply the EM algorithm as a moving window to group the decision boundaries between multiple batches; and
the peak readings are assigned by the processor to a correct batch with a correct sensor group ID using the decision boundaries.

\* \* \* \* \*